United States Patent
Kopp et al.

(10) Patent No.: US 6,925,230 B2
(45) Date of Patent: Aug. 2, 2005

(54) LONG PERIOD CHIRAL FIBER GRATING APPARATUS

(75) Inventors: Victor Il'ich Kopp, Flushing, NY (US); Victor Tchourikov, West Patterson, NJ (US)

(73) Assignee: Chiral Photonics, Inc., Clifton, NJ (US)

( * ) Notice: Subject to any disclaimer, the term of this patent is extended or adjusted under 35 U.S.C. 154(b) by 0 days.

(21) Appl. No.: 10/390,892

(22) Filed: Mar. 21, 2003

(65) Prior Publication Data

US 2003/0179999 A1 Sep. 25, 2003

Related U.S. Application Data

(60) Provisional application No. 60/366,723, filed on Mar. 22, 2002.

(51) Int. Cl.⁷ .................................................. G02B 6/34
(52) U.S. Cl. ............................. 385/37; 385/27; 385/28
(58) Field of Search ............................. 385/11, 12, 27, 385/28, 31, 37

(56) References Cited

U.S. PATENT DOCUMENTS

| | | | | |
|---|---|---|---|---|
| 5,703,978 A | * | 12/1997 | DiGiovanni et al. | 385/37 |
| 6,422,043 B1 | * | 7/2002 | DiGiovanni et al. | 65/402 |
| 6,707,966 B1 | * | 3/2004 | Cline et al. | 385/37 |
| 6,721,469 B2 | * | 4/2004 | Kopp et al. | 385/11 |
| 2003/0118265 A1 | * | 6/2003 | Kopp et al. | 385/11 |
| 2003/0118266 A1 | * | 6/2003 | Kopp et al. | 385/12 |

* cited by examiner

Primary Examiner—Juliana Kang
(74) Attorney, Agent, or Firm—Edward Etkin, Esq

(57) ABSTRACT

A long period chiral fiber grating ("LPCFG") that has a number of advantageous properties that can be readily utilized in a number of different applications is provided. The inventive LPCFG is a fiber grating having a pitch that exceeds the wavelength of light propagating therethrough. The LPCFG includes a number of dips in its transmission spectrum, but does not reflect any portion of the signal passing therethrough. The LPCFG is sensitive to changes in the refractive index of its external environment (or in the refractive index of a coating covering the LPCFG cladding). In response to changes in the external refractive index, the transmission dips shift proportionally to changes in the index, thus enabling the use of LPCFG as a fiber sensor element. In addition, the LPCFG is polarization sensitive—one circular polarized wave of one handedness is coupled to the cladding mode stronger than the wave of the other polarization handedness. This enables the LPCFG to be readily utilized in polarizers and for shaping the polarization spectra of signals passing therethrough (in one embodiment configured as multiple LPCFG elements having different pitches). The polarization sensitivity of the inventive LPCFG can also be used for verifying system integrity in chiral fiber sensor systems. In other embodiments of the present invention, the novel LPCFG can be used for modulating amplitude of the light signal propagating therethrough, or as a resonant active structure for add/drop filters.

16 Claims, 4 Drawing Sheets

LONG PERIOD CHIRAL FIBER GRATING APPARATUS

CROSS REFERENCE TO RELATED APPLICATIONS

The present patent application claims priority from the commonly assigned U.S. provisional patent application Ser. No. 60/366,723 entitled "Long Period Chiral Fiber Grating" filed Mar. 22, 2002.

FIELD OF THE INVENTION

The present invention relates generally to fiber gratings, and more particularly to an optical fiber grating having long period grating properties.

BACKGROUND OF THE INVENTION

Fiber gratings are incorporated into components that form the backbone of modern information and communications technologies, and are suitable for a wide range of applications, such as information processing and optical fiber communication systems utilizing wavelength division multiplexing (WDM). There are many different fiber grating types and configurations. For example, fiber Bragg gratings are actually one-dimensional photonic stop band structures that are useful in lasing, filtering and sensing applications. Various Bragg grating configurations also include chirped fiber gratings useful in chromatic dispersion compensators and apodized fiber gratings that are used to eliminate sidelobes in signal transmission spectra.

Another type of grating—a long period fiber grating—is of particular interest in sensing and filtering applications, and in other applications in which modulation is achieved by coupling of light into radiating or co-propagating cladding modes rather than by reflection. Unlike a fiber Bragg grating, a long period fiber grating is typically used for coupling the mode of the fiber core into the fiber cladding, which results in attenuation of the transmitted fiber mode. There are multiple transmission dips in the spectrum of a long period fiber grating. These transmission dips occur without reflection of the light signal passing therethrough. The positions of these dips along the spectral range depend strongly on the refractive index of a medium outside the cladding of the fiber. Thus, changing the refractive index outside the fiber produces a shift in the transmission dips. Typically, the period of a long period fiber grating is significantly longer than the wavelength of light passing through the fiber.

The conventional method of manufacturing fiber gratings (including long period fiber gratings) is based on photo-induced changes of the refractive index. Extended lengths of periodic fiber are produced by moving the fiber and re-exposing it to the illumination while carefully aligning the position so that it is in phase with the previously written periodic modulation. The fiber core utilized in the process must be composed of specially prepared photorefractive glass, such as germanium doped silicate glass. This approach limits the length of the resulting grating and also limits the index contrast produced. Furthermore, such equipment requires perfect alignment of the lasers and exact coordination of the fiber over minute distances when it is displaced prior to being exposed again to the laser beam.

It would thus be desirable to provide an advantageous long period fiber grating that has superior properties to previously known long period fiber gratings and that is easy to fabricate.

BRIEF DESCRIPTION OF THE DRAWINGS

In the drawings, wherein like reference characters denote elements throughout the several views.

SUMMARY OF THE INVENTION

The present invention is directed to a novel long period chiral fiber grating (hereinafter "LPCFG") that has a number of advantageous properties that can be readily utilized in a number of different applications. Essentially, the inventive LPCFG is a fiber grating having a pitch that exceeds the wavelength of light propagating therethrough. Instead of reflecting light of certain wavelengths like a fiber Bragg grating, the LPCFG includes a number of dips in its transmission spectrum, but does not reflect any portion of the signal passing therethrough. One of the features of the LPCFG is that it is sensitive to changes in the refractive index of its external environment (or to the refractive index of a coating covering the LPCFG cladding). In response to changes in the external refractive index, the transmission dips shift proportionally to changes in the index.

Another advantage of the LPCFG is that unlike conventional long period gratings, it is polarization sensitive—one circular polarized wave is coupled to the cladding mode more strongly than the wave of the other polarization. This enables the LPCFG to be readily utilized in polarizers and for shaping the polarization spectra of signals passing therethrough (for example via a structure configured with multiple sequential LPCFG elements having different pitches an/or pitch distributions). The polarization sensitivity of the inventive LPCFG can also be used for verifying system integrity in chiral fiber sensor systems utilizing light with the polarization which is not affected by the long period grating.

In other embodiments of the present invention, the novel LPCFG can be used for modulating the amplitude of the light signal propagating therethrough or as a resonant active structure for add/drop filters.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION

The present invention is directed to a novel optical chiral fiber having properties similar to a long period grating. The inventive long period chiral fiber grating is preferably fabricated by imposing (via twisting, wrapping and/or machining the fiber) one or two identical coaxial helices along the fiber's length. Preferably, the pitch of the inventive chiral fiber structure is of sufficient magnitude to impose long period grating properties thereon. It should be noted, that for the purposes of the present invention, a long period chiral fiber grating is defined as a fiber grating having a pitch that exceeds the wavelength of light propagating therethrough.

Figure 1:
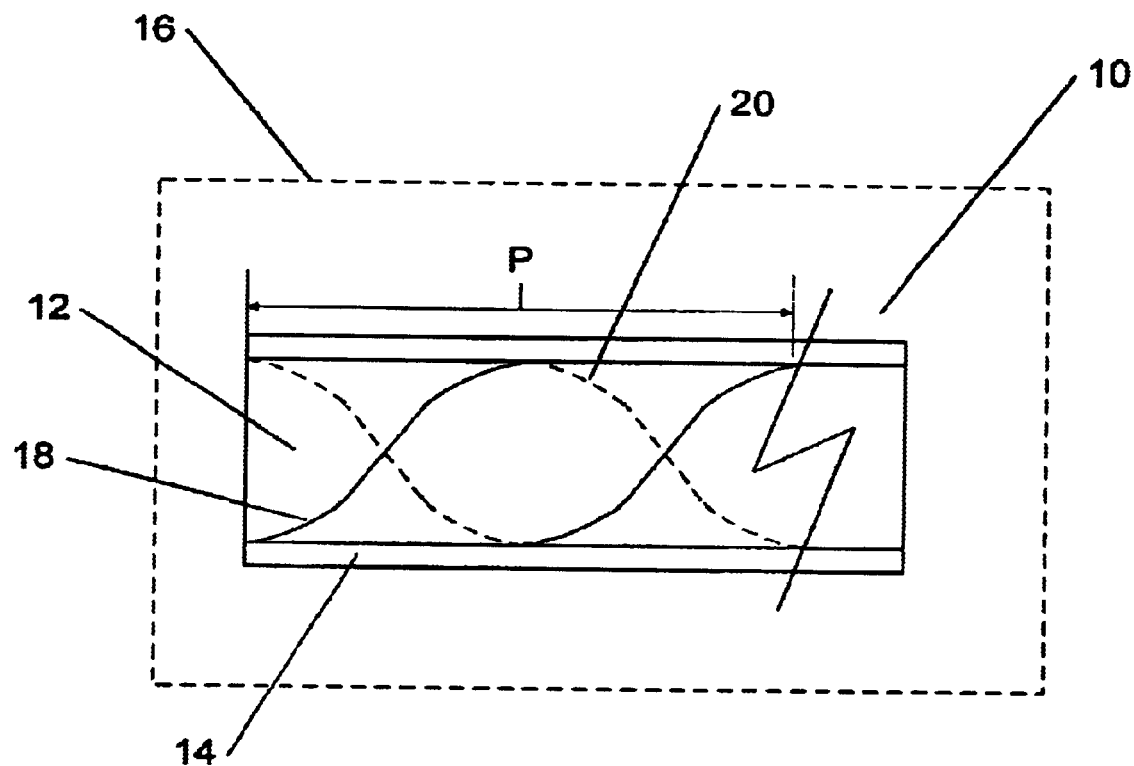
FIG. 1 is a schematic diagram of a side view of a first embodiment of a long period chiral fiber grating structure of the present invention.

Referring now to FIG. 1, an exemplary embodiment of a long period chiral fiber grating 10 (hereinafter "LPCFG 10") is shown. The LPCFG 10 includes a fiber core 12, and a cladding 14 surrounding the core 12. The coaxial helices 18 and 20 are formed by twisting a fiber having non-circular 180 degree cross sectional symmetry (for example due to an elliptical or a rectangular shape of the cross-section of the core, or having longitudinal grooves inscribed along the core, or having lengths of longitudinally disposed secondary dielectric materials, or having a core of two different materials split into opposing quarter-sections). The helices 18, 20 may also be formed by wrapping a conventional optical fiber with dielectric materials to form at least one of the helices 18, 20, or by cutting the helices 18, 20 into the fiber surface. Optionally, only a single helix 18 or 20 may be utilized. Preferably, the pitch defined by one or both of the helices 18, 20 is of sufficient magnitude such that the LPCFG 10 has long period grating properties. Various helical chiral fibers that may be adapted for use with the present invention are disclosed and described in greater detail in the commonly assigned co-pending U.S. Patent application entitled "Chiral Fiber Grating," which is incorporated by reference herein in its entirety.

Figure 2:
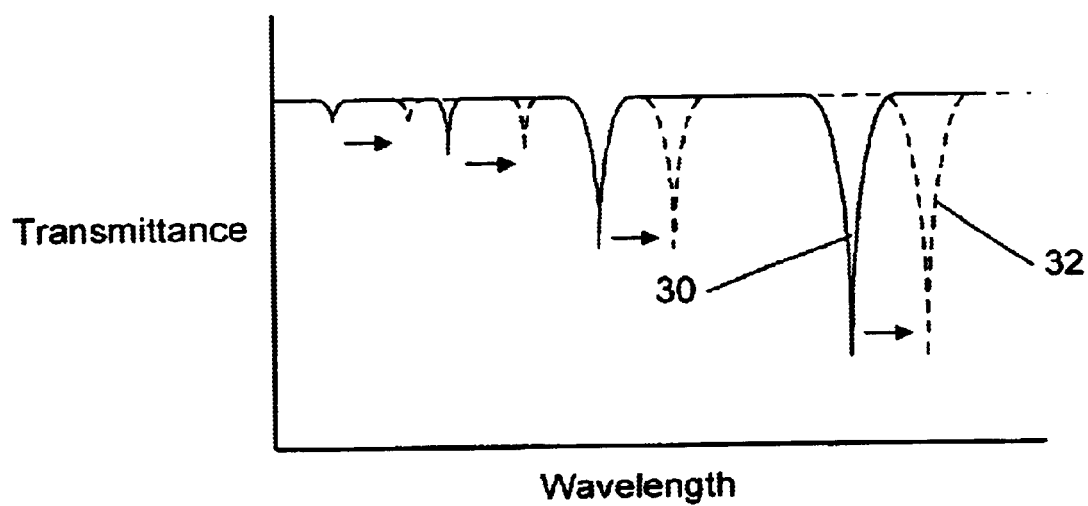
FIG. 2 is a graph diagram of a transmission gap shift caused when the refractive index of the material, surrounding the inventive long period chiral fiber grating structure of FIG. 1, changes.

The inventive LPCFG 10 may be defined both by its pitch P and by differences between the core 12 and cladding 14 refractive indices ($n_{core}$ and $n_{clad}$, respectively). The values for $n_{core}$ and $n_{clad}$ may be selected as a matter of design choice without departing from the spirit of the invention, as long as the selected values satisfy the condition that the resulting pitch is greater than a wavelength λ of a light signal propagating through the LPCFG 10, resulting in dips in the transmission spectrum without causing reflections. An exemplary transmission spectrum 30 of the LPCFG 10 is shown in FIG. 2.

The LPCFG 10 may be surrounded by a medium 16 (of a refractive index $n_e$), which may be the external environment, or it may be a coating applied over the cladding 14. The sensitivity of the LPCFG 10 to changes in the outside $n_e$, enables its utilization in a number of advantageous applications. In one embodiment of the present invention, the LPCFG 10 may be used in a sensor to detect changes in the external refractive index $n_e$ by monitoring shifts in the LPCFG 10 transmission dips (as shown in FIG. 2) in response to changes in $n_e$. An exemplary new position of the transmission dips resulting from a shift in response to a change in $n_e$, is shown in FIG. 2 as a shifted transmission spectrum 32.

Figure 3:
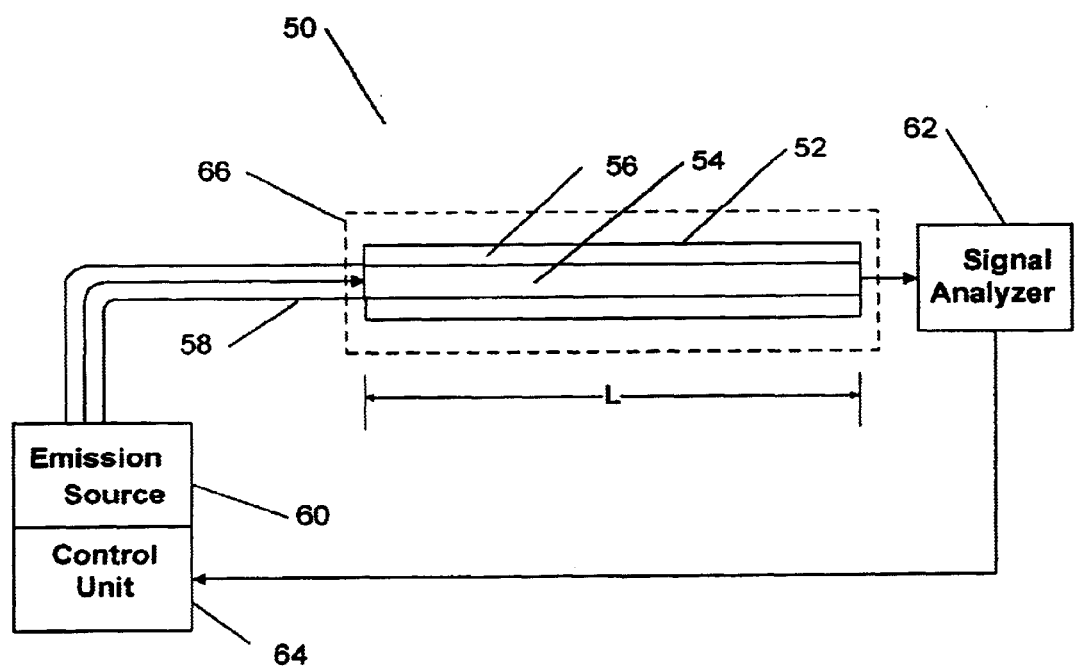
FIG. 3 is a schematic diagram of an exemplary embodiment of a chiral fiber sensor advantageously utilizing the long period chiral fiber grating of FIG. 1.

Referring now to FIG. 3, an exemplary embodiment of a LPCFG sensor 50 is shown. The sensor 50 comprises a LPCFG sensor element 52, with a core 54 and a cladding 56 surrounding the core 54. Both the core 54 and the cladding 56 may be composed from a variety of optical materials (e.g. glass) selected as a matter of design choice. A length L of the LPCFG sensor element 52 is also selected as a matter of design choice in accordance with the desired application of the sensor 50.

An optical fiber connector 58 is connected to one of the ends of the sensor element 52 and to an emission source 60. The length of the fiber connector 58 may be selected as a matter of design choice. For example, if the LPCFG sensor 50 is configured for use in either remote or in a confined or inaccessible space, the fiber connector 58 may be of a significant length. The emission source 60 may be any source capable of emitting electromagnetic radiation. The other end of the sensor element 52 is connected to a signal analyzer 62 for detecting the shifts in the dips in the electromagnetic transmission spectrum of the sensor element 52. Advantageously, a change in $n_e$ (i.e. the refractive index of the environment surrounding the sensor element 52) causes shifts in the transmission dips that are detectable by the signal analyzer 62. It should be noted that the emission source 60 and the signal analyzer 62 may be configured to operate in one of three different modes as a matter of design choice without departing from the spirit of the invention. In a first mode, the emission source 60 is configured as a tunable electromagnetic emission source and the signal analyzer 62 is configured as a photodetector. In a second mode, the emission source 60 is configured as a broadband electromagnetic emission source and the signal analyzer 62 is configured as a spectrometer. And in a third mode, the emission source 60 is configured as a fixed frequency emission source selected to emit at a frequency near or at the area of one of the expected transmission dips, and the signal analyzer 62 is configured as a photodetector.

In an alternate embodiment of the present invention, a coating 66 having a refractive index $n_e$ is applied over the sensor element 52. In accordance with the present invention, the coating 66 is selected such that its refractive index $n_e$ changes in response to a particular change in external environment around the sensor element 52, for example one or more of physical stress, temperature, pressure, electrical current, electromagnetic field, etc. As previously discussed, the signal analyzer 62 can sense changes in $n_e$ by detecting shifts in the transmission dips.

Both the emission source 60 and the signal analyzer 62 may be connected to an optional sensor control unit 64. The control unit 64 selectively controls the emission source 60 and interprets the shifts in the transmission dips detected by the signal analyzer 62. For example, while a signal analyzer 62 can sense that a shift has occurred, indicating a change in pressure or temperature (depending on the configuration of the LPCFG sensor 50), the control unit 64 can advantageously determine the magnitude of the transmission dips shift, and thus, the magnitude of the change in pressure or temperature. It should also be noted that the LPCFG sensor element 52 can be readily adapted for use with various embodiments of the novel chiral fiber sensor disclosed in the co-pending commonly assigned U.S. Patent application entitled "Chiral Fiber Sensor Apparatus and Method."

In another embodiment of the present invention, the LPCFG sensor 50 may be re-configured as a light amplitude modulator by selecting a coating 66 composed of a material with a refractive index $n_e$ that is controllable by varying its exposure of to one or more of: light, electrical current, electrical field, magnetic field, temperature, and pressure. The emission source 60 is preferably configured as a fixed frequency source with emission frequency being near or in area in one of the dips in the expected transmission spectrum. The signal analyzer 62 and the control unit 64 are not necessary for this configuration.

This arrangement enables controllable amplitude modulation of light transmitted through the LPCFG element 52 at a wavelength near the transmission dips.

Figure 4:
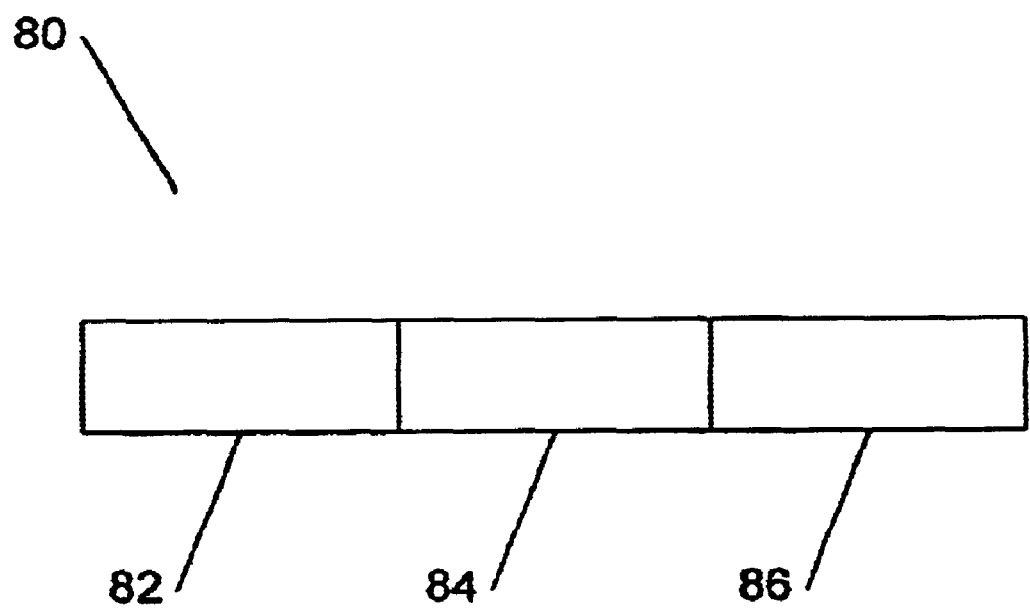
FIG. 4 is a schematic diagram of an exemplary embodiment of a polarization spectrum shaping component utilizing the long period chiral fiber grating of FIG. 1.

Unlike conventional long period gratings, the inventive LPCFG 10 is polarization sensitive—a wave of one circular polarization is coupled to the cladding mode stronger than the wave of the other circular polarization. This feature can be advantageously utilized to create a circular polarizer, such as one disclosed in a co-pending commonly assigned U.S. Patent application entitled "Chiral In-Fiber Adjustable Polarizer Apparatus and Method", which is hereby incorporated by reference herein in its entirety. Utilizing chirped or apodized LPCFGs or series of LPCFGs with different or randomized pitches, as a matter of design choice, a desirable shape of the polarization spectrum can be readily obtained. Referring now to FIG. 4, a LPCFG polarizer component 80, such as can be utilized in the above-incorporated "In-Fiber Polarizer" Patent application, is shown. The polarizer component 80 includes three LPCFG elements 82, 84, 86. Each of these elements 82, 84, 86 is selected from a group of a standard LPCFG (e.g. several standard LPCFG each having a different pitch), a chirped LPCFG, an apodized LPCFG, or a LPCFG with a randomly generated or otherwise non-uniform pitch distribution. The specific LPCFG pitch configurations are selected as a matter of design choice depending on the desired polarization spectrum. While three elements 82, 84, 86 are shown, it should be noted that any number of LPCFG elements may be utilized as a matter of design choice without departing from the spirit of the invention.

The advantageous polarization sensitivity properties of the LPCFG 10 or LPCFG polarizer component 80 can also be utilized for testing the integrity of the fiber sensing systems. One of the drawbacks of using fiber sensors is their relative fragility. Furthermore, because fiber sensors are typically installed in hard-to-reach or dangerous locations, it is difficult to determine if the absence of a sensor signal is due to the absence in a change in the condition(s) being sensed or due to a problem with the sensor element, the emission source, or the fiber optic line leading to the sensor element. It is thus highly desirable to provide some means for determining that a fiber sensor is functioning even when the condition being sensed is not present. Because only a single circularly polarized wave propagating through the LPCFG 10, 80 is sensitive to changes in the external environment, the polarized wave of the other handedness is advantageously continuously monitored to insure system integrity, even when environmental changes are not present. For example, in the LPCFG sensor 50 of FIG. 3, this monitoring may be performed by the signal analyzer 62 and/or the control unit 64.

Returning now to FIG. 1, when the LPCFG 10 is configured as a resonant optically active device, it can be very useful in applications such as add/drop filters. For example, the LPCFG 10 can be advantageously utilized in the devices disclosed in the co-pending commonly assigned U.S. Patent application entitled "Add-Drop Filter Utilizing Chiral Elements" and in the co-pending commonly assigned U.S. Patent application entitled "Cinfigurable Add-Drop Filter Utilizing Chiral Fiber Gratings".

Various apparatus and method that may be advantageously adapted for fabricating the LPCFG 10 are disclosed in the commonly assigned co-pending U.S. Patent application entitled "Apparatus and Method for Manufacturing Periodic Grating Optical Fibers", "Apparatus and Method of Manufacturing Chiral Fiber Bragg Gratings", and "Apparatus and Method of Manufacturing Helical Fiber Bragg Gratings", which are all incorporated by reference herein in their entirety. The various techniques of the above-incorporated fabrication patents may be readily used to control the period of the LPCFG 10 during fabrication such that the period is sufficient to provide long period grating properties to the LPCFG 10.

Thus, while there have been shown and described and pointed out fundamental novel features of the invention as applied to preferred embodiments thereof, it will be understood that various omissions and substitutions and changes in the form and details of the devices and methods illustrated and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, the therefore, to be limited only as indicated by the scope of the claims appended hereto.

We claim:

1. A chiral fiber grating configured for controlling a light signal transmission of a predetermined wavelength therethrough, comprising:
    a modified optical fiber having at least one core mode, and at least one of: at least one cladding mode and at least one radiating mode, said modified optical fiber further comprising:
        an optical chiral fiber core having a predetermined pitch and being of a single predetermined handedness; and
        a cladding surrounding said core, wherein said predetermined pitch is configured to be greater than the predetermined wavelength to impart long period grating properties to said modified optical fiber.

2. The chiral fiber grating of claim 1, wherein said predetermined pitch is of sufficient value to couple said at least one core mode to said at least one radiating mode.

3. The chiral fiber grating of claim 2, wherein the light signal comprises a first and a second circularly polarized component, and wherein said predetermined pitch is further configured to be of sufficient value to selectively couple said at least one core mode to said at least one radiating mode only for one of said first and second polarized components.

4. The chiral fiber grating of claim 1, wherein said modified optical fiber is disposed within an external medium having a refractive index, and wherein said predetermined pitch is further configured to be of sufficient value to modify transmission of the light signal in response to changes in said refractive index.

5. The chiral fiber grating of claim 1, wherein said predetermined pitch is further configured to be of sufficient value to couple said at least one core mode to said at least one cladding mode.

6. The chiral fiber grating of claim 5, wherein the light signal comprises a first and a second circularly polarized component, and wherein said predetermined pitch is further configured to be of sufficient value to selectively couple said at least one core mode to said at least one radiating mode only for one of said first and second polarized components.

7. The chiral fiber grating of claim 5, wherein said predetermined pitch is configured to be of sufficient value to generate at least one transmission dip for a wave of one polarization handedness in a spectral characteristic of the transmitted light signal, wherein said at least one transmission dip shifts in response to at least one change in a predetermined refractive index of a medium external to said cladding.

8. The chiral fiber grating of claim 7, wherein said medium comprises at least one coating layer of said predetermined refractive index disposed around said cladding.

9. The chiral fiber grating of claim 8, further comprising means for selectively changing said predetermined refractive index by varying at least one condition imposed on said at least one coating layer selected from a group comprising: temperature, pressure, electric current, magnetic field, electric field, and light, such that an amplitude of the light signal is thereby modulated.

10. The chiral fiber grating of claim 8, further comprising means for sensing at least one change in said predetermined refractive index by monitoring at least one shift in said plural transmission dips.

11. The chiral fiber grating of claim 10, wherein said at least one change is selected from a group comprising: temperature, pressure, electric current magnetic field, electric field, and light.

12. The chiral fiber grating of claim 10, wherein a first magnitude of said at least one shift is proportional to a second magnitude of said at least one change, further comprising a control system operable to determine said second magnitude from said first magnitude.

13. The chiral fiber grating of claim 7, further comprising:
at least one other optical system component connected thereto; and
means for sensing integrity of the chiral fiber grating and of said at least one other optical system component, by monitoring a second wave of another polarization handedness in said spectral characteristic of the transmitted light signal, wherein presence of said second wave is indicative of system integrity.

14. The chiral fiber grating of claim 1, wherein said predetermined pitch is subjected to a modification to produce a desirable transmission spectrum.

15. The chiral fiber grating of claim 14, wherein said modification is selected from the following group; chirping, apodization, random pitch, and at least one varying pitch magnitude.

16. The chiral fiber grating of claim 14, comprising at least one sequential additional chiral fiber grating also having long period grating properties and having an additional core and an additional pitch different from said pitch, such that the chiral fiber grating and said at least one additional chiral fiber grating together produce a desirable transmission spectrum for the light signal passing therethrough.

* * * * *